May 10, 1932.　　　H. S. SIMPSON　　　1,857,337
MULLING MACHINE
Filed Dec. 2, 1929　　　3 Sheets-Sheet 1

Inventor:
Herbert S. Simpson.
by Charles H. Wills Atty.

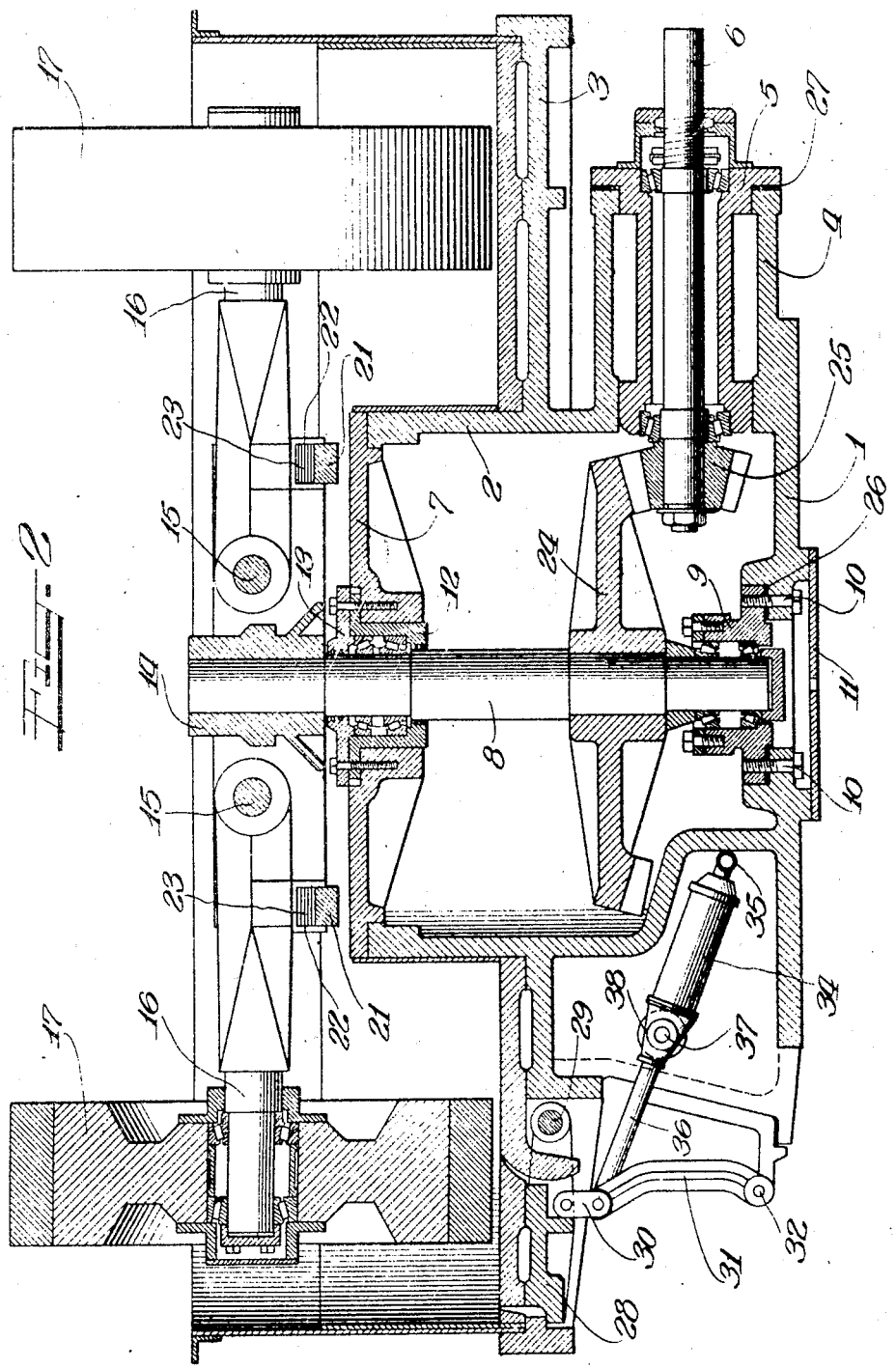

May 10, 1932.   H. S. SIMPSON   1,857,337
MULLING MACHINE
Filed Dec. 2, 1929   3 Sheets-Sheet 3
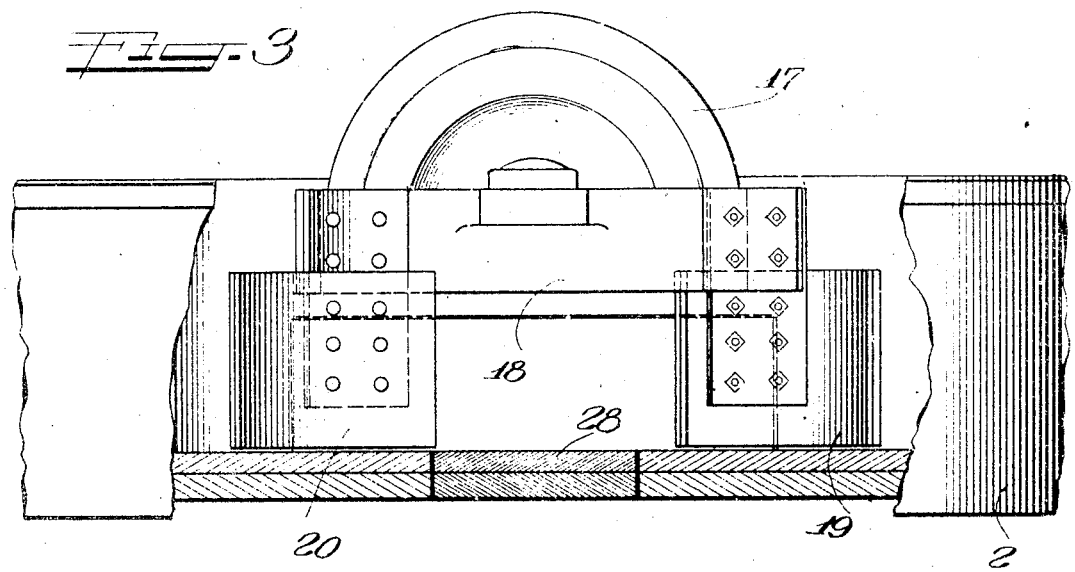
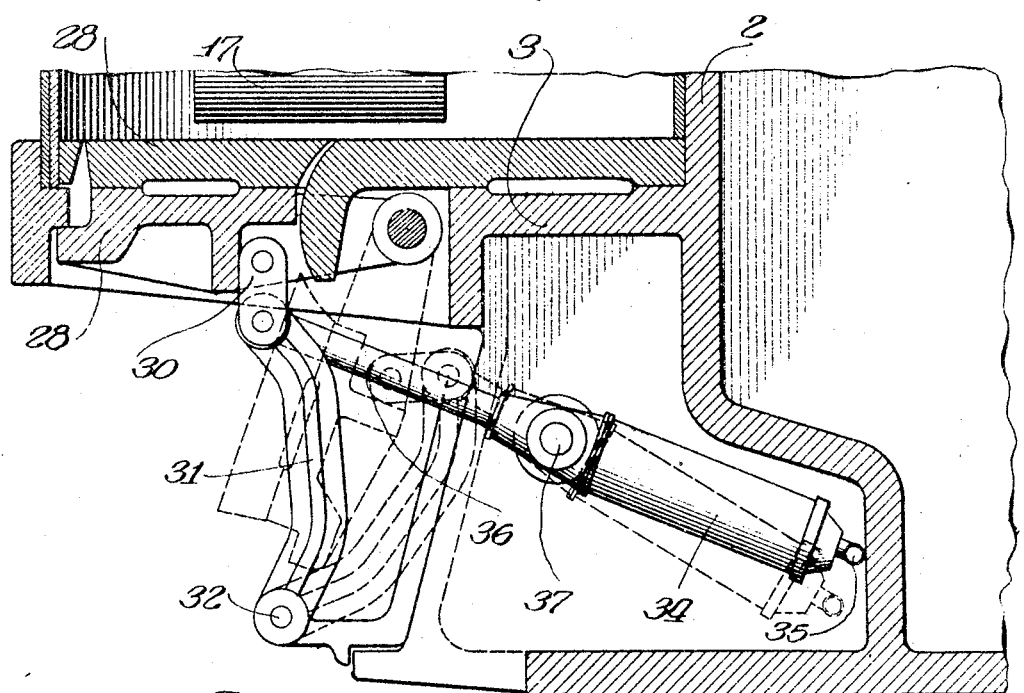
Inventor:
Herbert S. Simpson.
by Charles H. Wills Atty.

Patented May 10, 1932

1,857,337

UNITED STATES PATENT OFFICE

HERBERT S. SIMPSON, OF CHICAGO, ILLINOIS

MULLING MACHINE

Application filed December 2, 1929. Serial No. 411,060.

This invention relates to a mulling machine primarily designed for mulling and mixing sand or the like.

Machines of this character are usually used in a mill or factory where a great deal of abrasive dust is present that enters the gears and bearing with the result that these parts very soon wear out. Further machines of this character have heretofore been difficult to disassemble in order to replace the worn parts.

It is among the objects of this invention to provide an integral casing in which the gears and bearing are housed or enclosed in a dust proof oil chamber whereby the life thereof is greatly prolonged, and wherein the parts may be readily disassembled. It is also an object of this invention to provide adjustments for properly meshing the operating gears, and a novel door operating mechanism.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 2 is an enlarged sectional view taken upon the line II—II of Figure 1.

Figure 3 is an enlarged fragmentary sectional view taken upon the line III—III of Figure 1 showing the interior parts in elevation.

Figure 4 is an enlarged fragmentary sectional view taken substantially upon the line IV—IV of Figure 1.

Figure 1:
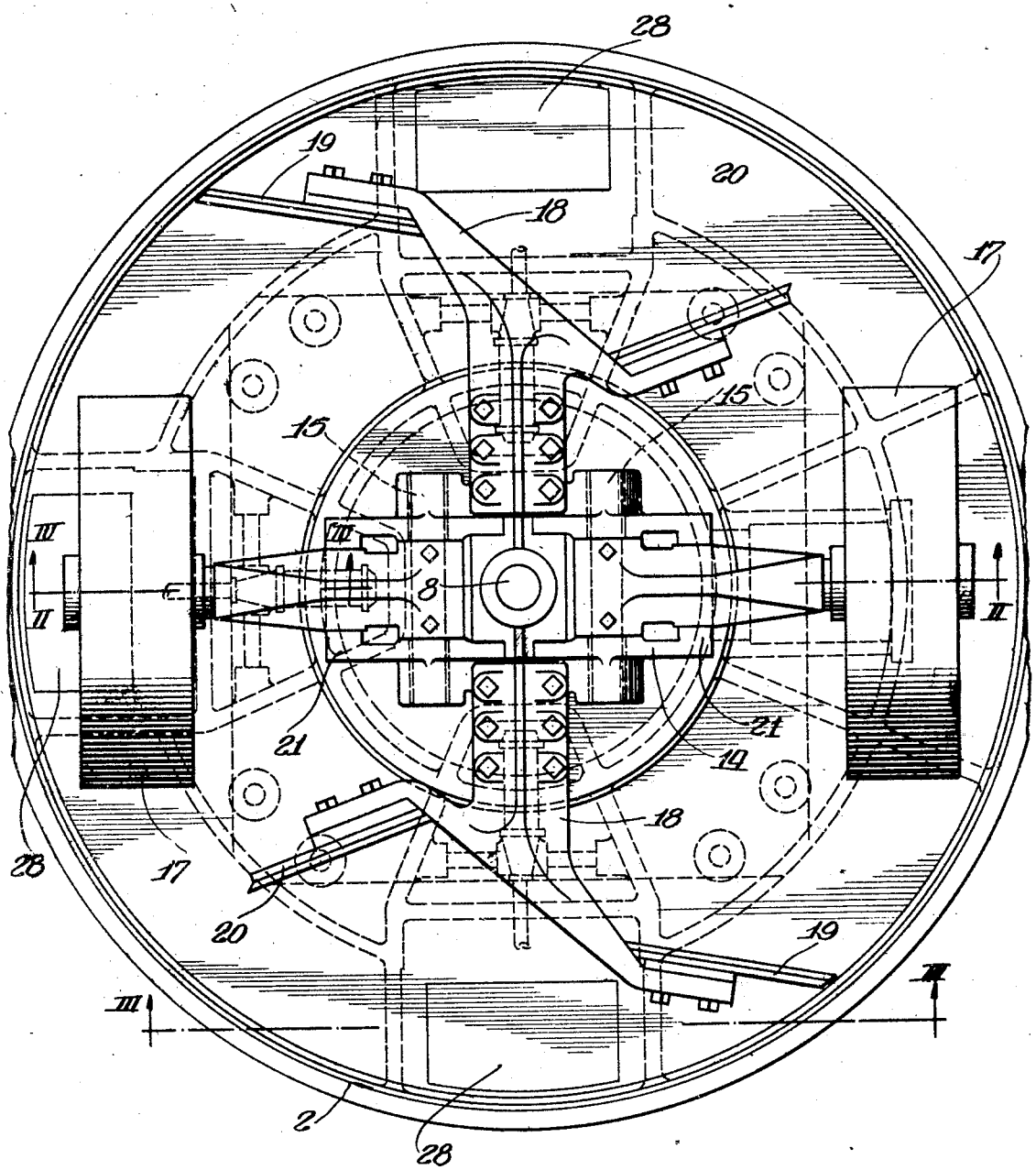
Figure 1 is a top plan view of a mulling machine embodying this invention.

According to this invention there is provided a casing which consists of a base portion 1 and a vertical cylindrical portion 2 which forms an oil or lubricant chamber which is provided with an annular flange 3 which forms the bottom of the mulling pan. The casing also comprises a cylindrical bearing 4 for receiving a bearing sleeve 5 for the driving shaft 6 which is supported in the bearing sleeve 5 by means of suitable roller bearings.

The cylindrical portion 2 is closed by a cover member 7 to provide a dust proof housing, and this cover member 7 and the base portion 1 are provided with suitable openings for receiving the bearings for the muller shaft 8. A bearing member 9 surrounds the lower end of the muller shaft 8 and this bearing is removably attached by screws 10 to the base 1 of the casing in registry with the opening therein and closes said opening to prevent lubricant from escaping therethrough. Suitable roller bearings are provided between the shaft 8 and the bearing 9. The opening in the base 1 is preferably closed by a cover plate 11 which can easily be removed when access to the screws 10 is desired. A bearing 12 is inserted in the cover 7 and fits in the aperture thereof. This bearing houses the roller bearings for the upper end of the shaft. An apertured cap 13 which surrounds the shaft 8 and which is secured to the cover 7 closes the open end of the bearing 12. A cross head 14 is secured to the upper end of the muller shaft 8 and a pair of muller shafts 16 are pivotally connected to the cross head 14 by means of the pivots 15. Mullers 17 are suitably journalled upon the ends of the shaft 16 for tilting movement with respect to the bottom of the pan. The cross head also has a pair of arms 18 upon which plows 19 and 20 are secured as shown in Figure 1 for directing the sand into the path of the mullers.

It will be noted that the cross head 14 has a pair of ribs 21 extending transversely of the muller shafts as shown in Figures 1 and 2 and these muller shafts have depending channel guides 22 which fit over the ribs 21. There are suitable shims or adjusting plates 23 adapted to be placed between the ribs 21 and the muller arms in order that the same may be supported at varying distances upon the floor of the mulling pan.

The mulling shaft 8 is adapted to be driven by a beveled gear 24 which is secured thereon and which merges with a beveled pinion 25 upon the shaft 6. These gears are adapted to run in oil or lubricant in the oil chamber. In order that the gears 24 and 25 may properly mesh certain adjustments have been provided. To adjust the beveled gear 24 with its shaft 8, shims or adjusting plates 26 may be placed between the bearing 9 and the casing 1. To longitudinally adjust the shaft 6 in order that the pinion 25 may properly mesh with the gear 24, the sleeve 5 is made adjustable through the instrumentality of shims or adjusting plates 27 between the end of the sleeve 5 and the casing 4 as shown in Figure 2. It will be obvious that by the adjustments of the bearings for the shafts it will be possible to secure a proper meshing of the gear 24 and the pinion 25. It should be noted that the pinion 25 is small enough to pass through the bearing for the sleeve 5 so that the sleeve and shaft with its gear 25 may readily be removed in an endwise direction.

A pair of diametrically opposite doors 28 are provided in the bottom of the pan 3 shown in Figures 1 and 2. One of these doors is shown in section in Figure 2 and the operating mechanism for opening and closing the door is shown therein and will now be described. The doors 28 are mounted to swing upon shaft 29 so that the same may swing downwardly and inwardly toward the center of the machine when they are opened. A short link 30 is pivoted to the bottom of the door at one end while the opposite end of the link 30 is pivoted to a second link 31 which is pivoted at its lower end to a bracket on the casing as indicated at 32. A fluid pressure cylinder 34 which is provided with an opening 35 for receiving an airline has its piston rod 36 connected to the pivot point between the links 30 and 31. The fluid cylinder 34 is suitably supported by means of a pair of trunnions 37 which in turn are supported by suitable brackets 38 on the casing. When fluid is admitted into the cylinder 34 the piston will be projected forwardly for closing and maintaining the door in closed position. When the air is allowed to escape from the cylinder, the pressure of the door due to the material thereon will automatically open for discharging purposes. In addition to the diametrically opposite doors, the pan may be provided with other suitable doors at various points if desired. A third door has been illustrated which is located between the two diamtrically opposite doors as indicated at 28.

According to this invention, the shaft 8 may be readily withdrawn from the casing without disassembling the bearings thereon or parts of the machine. To accomplish this, it is necessary to remove the cross head 14 and the mullers, unscrew the cover 7 and the cover 11 at the base and remove the screws 10, it will then be possible to withdraw the shaft 8 with the said cover 7 and gear 24 and bearing 9 thereon. In other words the shaft 8 and its bearings can readily be disassembled and reassembled without very much time and effort being lost or wasted. After the shaft 8 has been replaced in the casing and it should happen that the gears 24 and 25 did not properly mesh, adjusting plates or shims 26 and 27 may be inserted or removed to secure the proper meshing of the gears 24 and 25.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a mulling machine, a casing having a base, a cylindrical portion above said base forming a lubricant chamber and a radial flange forming a mulling pan, mullers in said pan, a vertical shaft connected to said mullers and extending into said lubricant chamber, a cover for said chamber, a dust proof bearing in said cover for said shaft, said casing having a longitudinal bearing, a shaft mounted in said bearing and extending into said lubricant chamber, and intermeshing gears on said shafts.

2. In a mulling machine, a casing having a base, a vertical wall extending from said base for forming a lubricant chamber, and a radial flange extending from said wall for forming the bottom of the mulling pan, a pair of mullers in said pan, a shaft connected to said mullers and extending into said chamber, a second shaft journalled in said casing and extending into said chamber, and meshing gears on said shafts within said chamber for the purpose set forth.

3. In a mulling machine, a casing comprising a cylindrical vertical wall forming a lubricant chamber, an intermediate radially extending flange forming a mulling pan and a horizontally extending bearing having a bore communicating with said lubricant chamber, a cover for said chamber, mullers in said pan, operating means for said mullers including a vertical shaft journalled in said cover and extending into said chamber, a bearing in the bottom of said chamber for said shaft, a second shaft journalled in said bore and extending into said chamber and intermeshing gears upon said shafts within said chamber.

4. In a mulling machine, a casing comprising a cylindrical wall forming a lubricant chamber and a radially extending flange forming a mulling pan, means for closing the top and bottom of said chamber including a pair of alined bearings, the upper bearing being dust proof and the lower bearing being lubricant proof, mullers in said pan, means for operating said mullers including a vertical shaft journalled in said bearings, and a second shaft journalled in said casing and extending into said chamber and geared to said first mentioned shaft.

In testimony whereof I have hereunto subscribed my name at Chicago, Cook County, Illinois.

HERBERT S. SIMPSON.